US007588065B2

(12) United States Patent
Serre

(10) Patent No.: US 7,588,065 B2
(45) Date of Patent: Sep. 15, 2009

(54) RADIAL-CARCASS TIRES FORMED BY USING SPECIFIC COHESIVE, LOW-HYSTERESIS COMPOSITIONS

(75) Inventor: Frédéric Serre, Veyre-Monton (FR)

(73) Assignee: Michelin Recherche et Technique, S.A., Granges_Paccot (CH)

( * ) Notice: Subject to any disclaimer, the term of this patent is extended or adjusted under 35 U.S.C. 154(b) by 0 days.

(21) Appl. No.: 09/501,408

(22) Filed: Feb. 10, 2000

(65) Prior Publication Data

US 2002/0068781 A1   Jun. 6, 2002

(30) Foreign Application Priority Data

Feb. 11, 1999   (FR) ................... 99 01766

(51) Int. Cl.
  *B60C 1/00* (2006.01)
  *B60C 15/00* (2006.01)
  *C08K 3/04* (2006.01)
  *C08K 3/36* (2006.01)

(52) U.S. Cl. ................. 152/547; 152/551; 152/553; 524/492; 524/493; 524/495; 524/496; 524/437; 524/571; 524/575; 524/575.5

(58) Field of Classification Search ................ 524/492, 524/493, 495, 496, 437; 152/548, 547, 551, 152/553, 148
See application file for complete search history.

(56) References Cited

U.S. PATENT DOCUMENTS

| 3,392,773 A | | 7/1968 | William et al. | |
|---|---|---|---|---|
| 5,394,919 A | * | 3/1995 | Sandstrom et al. | 152/537 |
| 5,496,486 A | * | 3/1996 | Staley | 510/441 |
| 5,681,874 A | * | 10/1997 | Lucas et al. | 523/212 |
| 5,844,050 A | * | 12/1998 | Fukahori et al. | 525/351 |
| 5,871,597 A | * | 2/1999 | Vasseur | 152/209.5 |
| 5,902,856 A | * | 5/1999 | Suzuki et al. | 525/237 |
| 5,929,157 A | * | 7/1999 | Matsuo | 524/496 |
| 6,008,295 A | * | 12/1999 | Takeichi et al. | 525/105 |
| 6,013,737 A | * | 1/2000 | Takagishi et al. | 525/332.7 |
| 6,046,266 A | * | 4/2000 | Sandstrom et al. | 524/492 |
| 6,075,092 A | * | 6/2000 | Nakamura et al. | 525/122 |
| 6,090,880 A | * | 7/2000 | Zimmer et al. | 524/492 |
| 6,103,811 A | * | 8/2000 | Midorikawa et al. | 524/495 |
| 6,109,320 A | * | 8/2000 | Miyazaki et al. | 152/540 |
| 6,136,919 A | * | 10/2000 | Zimmer et al. | 524/856 |
| 6,160,047 A | * | 12/2000 | Agostini et al. | 524/494 |
| 6,211,278 B1 | * | 4/2001 | Vanel | 524/492 |
| 6,533,008 B1 | * | 3/2003 | Lickes et al. | 152/209.5 |
| 6,776,206 B1 | * | 8/2004 | Segatta et al. | 152/541 |
| 2002/0042479 A1 | * | 4/2002 | Nanni et al. | 525/355 |
| 2004/0092647 A1 | * | 5/2004 | Chauvin | 524/496 |

FOREIGN PATENT DOCUMENTS

| EP | 0105822 | | 4/1984 |
|---|---|---|---|
| EP | 0738614 | | 10/1996 |
| EP | 799854 | * | 10/1997 |
| GB | 2024119 | | 1/1980 |
| JP | 09302146 | * | 11/1997 |

OTHER PUBLICATIONS

Lewis, Sr., Richard J.; Hawley's Condensed Chemical Dictionary, John Wiley and Sons, New York (1997) p. 900.*
Alger, Mark; Polymer Science Dictionary, Chapman and Hall, London (1989) p. 331.*
English Translation of JP 09302146 (1997).*

* cited by examiner

*Primary Examiner*—Vickey Nerangis
(74) *Attorney, Agent, or Firm*—Buchanan Ingersoll & Rooney PC

(57) ABSTRACT

The subject of the present invention is the use of cohesive, low-hysteresis compositions comprising small amounts of reinforcing fillers to produce profiled filing members arranged in the bottom zone of tires in order to improve the life thereof.

14 Claims, No Drawings

RADIAL-CARCASS TIRES FORMED BY USING SPECIFIC COHESIVE, LOW-HYSTERESIS COMPOSITIONS

BACKGROUND OF THE INVENTION

Specification

The present invention relates to the use of rubber compositions intended for the manufacture of tires as elastomeric internal filling compositions, also referred to as "cushion mixes", in the bottom zone of a tire.

Radial-carcass tires for motor vehicles bearing heavy loads at greater or lesser speeds, in particular those for heavy vehicles, have a framework formed of reinforcements or plies of metal wires coated with elastomers. Such tires comprise, in the bottom zone, one or more bead wires and a carcass reinforcement extending from one bead wire to the other and, at the crown, a crown reinforcement comprising two or more crown plies. This framework is consolidated by elastomeric compositions. Radial-carcass tires, intended to be fitted on vehicles bearing heavy loads at greater or lesser speeds, in particular those for heavy vehicles, are designed to be able to be recapped several times when the tread that is in contact with the ground is worn. This involves having available recappable carcasses which have not been subject to serious damage after wear of one or more treads.

The life of the tire is shortened due to the appearance of damage within a rubber profiled filling member, for example a break, which may then spread as far as the inner or outer surface of the tire, with the result that the tire cover must be discarded and replaced.

It is desirable for the cohesion of the rubber internal filler mixes to be as great as possible to avoid or reduce these incipient points for damage.

It is known to the person skilled in the art that elastomeric internal filler compositions undergo deformation upon each rotation of the wheel. Such deformation causes a great amount of heating which is harmful to the life of said compositions because, at operating temperatures which are frequently above 100° C., the mechanical properties and the reinforcement degrade over time by thermochemical and/or the thermo-oxidizing aging, with the consequence that the compositions become less resistant to mechanical stress.

In order to eliminate or at the very least minimize as far as possible the risks of breaking of the elastomeric internal filler mixes, i.e., those devoid of reinforcements, it is desirable for these mixes to have high mechanical cohesion as well as hysteresis loss characteristics which are as low as possible at the operating temperature of the tire.

The person skilled in the art, confronted with the problem of balancing minimal heating and high cohesion at high temperature, has proposed a large number of solutions. Thus, it has been proposed to use elastomeric internal filler compositions, i.e., cushion mixes, of relatively low hysteresis, in the form of:

(i) compositions based on natural rubber, pure or in a blend with polybutadiene, the reinforcing filler being a carbon black having a specific surface area preferably less than 110 m$^2$/g and used in an amount of about 25 phr (parts by weight per hundred parts of elastomer), as described in U.S. Pat. No. 3,392,773;

(ii) compositions based on natural rubber, pure or in a blend with polybutadiene, reinforced with a blend of carbon black and silica, the usual amounts of carbon black being from 30 to 35 phr and those of the silica from 10 to 15 phr;

(iii) compositions based on diene rubber and syndiotactic 1,2-polybutadiene as described in Patent Application JP-A-94/092108;

(iv) compositions based on natural rubber, possibly in a blend with another diene elastomer, comprising carbon black and thermoplastic polymer fibers as described in Patent Application JP-A-95/330960.

SUMMARY OF THE INVENTION

The Applicant has discovered that it is possible to obtain a balance between heating and improved cohesion and excellent resistance to the mechanical stresses with high deformation by the use of an elastomeric internal filler composition:

(i) based on natural rubber or synthetic polyisoprene having double bonds, the majority of which are cis-1,4 bonds, used pure or in a blend with another diene elastomer, and (ii) reinforced with:
  a clear filler selected from among precipitated or pyrogenic silicas comprising SiOH functions at the surface, precipitated aluminas comprising AlOH functions at the surface, a natural or precipitated silicoaluminate comprising at the surface both SiOH and AlOH groups, said clear filler being used in an amount from 15 phr to 40 phr and preferably from 20 phr to 35 phr, or
  a blend of clear filler, as described above, and carbon black, the BET specific surface area of which is between 30 and 160 m$^2$/g, preferably between 90 and 150 m$^2$/g, and the DBP structure of which is between 80 and 160 ml/100 g, wherein the total amount of filler is between about 15 phr and 50 phr and the amount of clear filler in phr is greater than or equal to that of the carbon black in phr minus 5 phr.

The measurement of BET specific surface area is effected in accordance with the method of BRUNAUER, EMMET and TELLER described in "The Journal of the American Chemical Society", vol. 60, page 309, February 1938, corresponding to Standard NFT 45007 of November 1987.

DETAILED DESCRIPTION

In the case of using clear filler, it is necessary to use a coupling and/or covering agent selected from among the agents known to the person skilled in the art. Preferred coupling agents, include, inter alia, sulphur-containing alkoxysilanes of the bis-(3-trialkoxysilylpropyl) polysulphide type, and among these in particular, bis-(3-triethoxysilylpropyl) tetrasulphide sold by DEGUSSA under the names Si69 for the pure liquid product and X50S for the solid product (blend 50/50 by weight with black N330). Covering agents include a fatty alcohol, an alkylalkoxysilane, such as a hexadecyltrimethoxy- or triethoxysilane sold by DEGUSSA under the names Si116 and Si216 respectively, diphenylguanidine, a polyethylene glycol, or a silicone oil possibly modified by means of OH or alkoxy functions. The covering and/or coupling agent is used in a ratio by weight relative to the filler of between 1/100 and 20/100, and preferably of between 2/100 and 15/100.

The elastomeric internal filler compositions or cushion mixes according to the invention, that are arranged in the bottom zone, are, for example, profiled members located axially to the outside of the upturn of the carcass reinforcement, the reinforcement profiles for the beads of the tire being located between the upturn of the carcass reinforcement and the bead reinforcement profiled member located radially above the bead wire and adjacent to said bead wire and/or axially to the outside of the upturn of the carcass reinforcement.

The diene elastomers which may be used in a blend with natural rubber or a synthetic polyisoprene having double bonds, the majority of which are cis-1,4 bonds, include a polybutadiene (BR) preferably having double bonds, the majority of which are cis-1,4 bonds, a solution or emulsion styrene-butadiene copolymer (SBR), a butadiene-isoprene copolymer (BIR) or, alternatively, a styrene-butadiene-isoprene terpolymer (SBIR). These elastomers may be modified during polymerization or after polymerization by means of branching agents, such as a divinylbenzene, or starring agents, such as carbonates, tin halides or silicon halides. Alternatively, the elastomers may be modified by means of functionalizing agents resulting in grafting oxygenated carbonyl or carboxyl functions or alternatively an amine function, such as, for example, by the action of dimethyl- or diethylamino-benzophenone on the chain or at the end of the chain. In the case of blends of natural rubber or of synthetic polyisoprene having double bonds, the majority of which are cis-1,4 bonds, with one or more of the diene elastomers referred to above, the natural rubber or the synthetic polyisoprene preferably comprises the majority of the blend and, more preferably, comprises an amount greater than 70 phr.

When a clear filler is used as the sole reinforcing filler, the hysteresis and cohesion properties are obtained using a precipitated or pyrogenic silica, or a precipitated alumina, or alternatively an alumosilicate of BET specific surface are of between 30 and 260 m$^2$/g. Preferably an amount of filler from 20 to 35 phr is used. Non-limiting examples of this type of fillers include the silicas KS404 from Akzo, Ultrasil VN2 or VN3 and BV3370GR from Degussa, Zeopol 8745 from Huber, Zeosil 175MP or Zeosil 1165MP from Rhodia, HL-SIL 2000 from PPG, etc.

In the case of a blend of carbon black with a clear filler, an amount of clear filler from 25 to 40 phr is preferably used.

Other examples of reinforcing fillers having the morphology and the SiOH and/or AlOH surface functions of the silica- and/or alumina-type materials previously described, which can be used according to the invention as partial or total replacement thereof, include carbon blacks modified either during synthesis by adding to the feed oil of the oven a compound of silicon and/or aluminum or after the synthesis by adding an acid to an aqueous suspension of carbon black in a solution of sodium silicate and/or aluminate so as to cover the surface of the carbon black at least in part with SiOH and/or AlOH functions. As in the case of the above clear fillers, the specific surface area of the filler lies between 30 and 260 m$^2$/g, and the total amount of silica- and/or alumina-type material filler is greater than or equal to 15 phr, preferably greater than 25 phr, and less than or equal to 35 phr. Non-limiting examples of this type of carbon-containing fillers with SiOH and/or AlOH functions at the surface include the CSDP-type fillers described in Conference No. 24 of the ACS Meeting, Rubber Division, Anaheim, Calif., 6-9May 1997, and of those of Patent Application EPA-0 799 854.

Additional fillers which may also be used to obtain the diene internal filler compositions having the reinforcement and hysteresis properties according to the invention include blends of one or more carbon blacks with one or more of the other fillers already mentioned having SiOH and/or AlOH functions at the surface, the overall amount of filler being between 15 and 50 phr, preferably between 20 and 45 phr, and the amount of filler with the SiOH and/or AlOH surface functions being greater than or equal to the amount of carbon black minus five.

Finally, with the aim of improving the working and/or the cost of the compositions according to the invention, without the hysteresis and cohesion characteristics being fundamentally changed, the filler or the blends of reinforcing fillers described above may be replaced in part by a less-reinforcing filler such as a crushed or precipitated calcium carbonate, a kaolin, etc., on the condition that x phr of reinforcing filler is replaced by x+5 parts of less-reinforcing filler, x being less than 15 phr.

The compositions according to the invention may cross-link under the action of sulphur, peroxides or bismaleimides with or without sulphur. They may also contain the other constituents usually used in rubber mixes, such as plasticizers, pigments, antioxidants, and cross-linking accelerators, such as benzothiazole derivatives, diphenylguanidine etc.

The compositions according to the invention may be prepared using known thermomechanical working processes for the constituents in one or more steps. For example, they may be obtained by thermomechanical working in one stage in an internal mixer for 3 to 7 minutes at a speed of rotation of the blades of 50 rpm or in two stages in an internal mixer for 3 to 5 minutes and 2 to 4 minutes respectively, followed by a finishing stage effected at about 80° C. during which the sulphur and the accelerator are incorporated, in the case of a sulphur-cross-linked composition.

The invention is illustrated by the following examples, which in no way constitute a limitation to the scope of the invention.

In all the examples, unless indicated otherwise, the compositions are given in parts by weight. In these examples, which may or may not be in accordance with the invention, the properties of the compositions are evaluated as follows:

Mooney Viscosity

The Mooney viscosity ML (1+4) is measured in accordance with Standard ASTM D1646.

Rheometry

The rheometry measurements are performed by measuring the torque on a Monsanto Model 100S rheometer. They are intended to monitor the vulcanization process by determining the time To in minutes which corresponds to the vulcanization delay and the time T99 in minutes which corresponds to 99% of the maximum torque measured.

Moduli of Elongation

The moduli of elongation are measured at 100% (ME100) and at 300 (ME300) in accordance with Standard ISO 37-1977.

Scott Break Index

These indices are measured at 23° C. or 100° C. The breaking stress (BS) is determined in MPa and the elongation at break (EB) in %.

Tearability Index

These indices are measured at 100° C. The force (TBS) is determined in MPa and the elongation at break (TEB) in % on a test piece of dimensions 10×105×2.5 mm notched at the center of its length over a depth of 5 mm.

Hysteresis Losses (HL)

The hysteresis losses (HL), or hysteresis, are measured by rebound at 60° in accordance with Standard ISO R17667 and are express in %.

EXAMPLE 1

The object of this example is to compare natural rubber compositions which are reinforced with silica, as a majority filler, compared with control compositions based on a majority of carbon black. These compositions are set forth in Table 1. They comprise, in the case of test 1, a composition according to the invention having a majority of silica and of carbon black, with the covering agent for the silica being Si116 (hexadecyltrimethoxysilane, from Degussa) and, in the case of test 2, a composition of the invention having a majority of silica and of carbon black, with polydimethylsiloxane of a molecular weight close to 400 (PDMS) as covering agent for the silica. The compositions used in tests 3 and 4 are controls representing the known prior art. The composition of test 3 contains a majority of carbon black and of silica bonded to the elastomer with the bonding agent X50S from Degussa and that of test 4 is composition based on N330. All these compositions are sulphur-vulcanizable.

The characteristics of the constituents are as follows:

Peptized natural rubber of Mooney ML (1+4) at 100° equal to 60

Antioxidant: N-(1,3-dimethyl butyl) N'-phenyl p-phenylene diamine

Soluble sulphur

Vulcanization accelerating agents

The compositions of tests 1 to 4 are obtained by processing all the ingredients, except for the sulphur and the accelerators, by thermomechanical working in one stage in an internal mixer for about 4 minutes at a speed of rotation of the blades of 50 rpm until a dropping temperature of 170° is reached, followed by a finishing stage effected at 80° C., during which the sulphur and the vulcanization accelerators are incorporated.

TABLE 1

| Composition | Test 1 Invention | Test 2 Invention | Test 3 Control | Test 4 Control |
| --- | --- | --- | --- | --- |
| Natural rubber | 100 | 100 | 100 | 100 |
| UVN3 | 35 | 35 | 15 | — |
| Black N330 | 5 | 5 | — | 35 |
| Black N347 | — | — | 40 | — |
| X50S | — | — | 3 | — |
| Si116 | 5.00 | — | — | — |
| PDMS | — | 2.00 | — | — |
| ZnO | 7.00 | 7.00 | 7.00 | 2.10 |
| Stearic acid | 1.00 | 1.00 | 2.00 | 1.40 |
| Antioxidant | 1.50 | 1.50 | 1.50 | 0.70 |
| Sulphur | 1.75 | 1.75 | 1.80 | 1.75 |
| Accelerators | 1.50 | 1.51 | 1.25 | 1.00 |

The vulcanization is effected at 140° for a time sufficient to achieve 99% of the maximum torque at the rheometer.

The properties of these four compositions are compared. The results are set forth in Table 2.

TABLE 2

| Composition | Test 1 Example | Test 2 Example | Test 3 Control | Test 4 Control |
| --- | --- | --- | --- | --- |
| Natural rubber | 100 | 100 | 100 | 100 |
| UVN3 | 35 | 35 | 15 | — |
| Black N330 | 5 | 5 | — | 35 |
| Black N347 | — | — | 40 | — |
| X50S | — | — | 3 | — |
| Si116 | 5.00 | — | — | — |
| PDMS | — | 2.00 | — | — |
| ME100 | 1.0 | 1.2 | 2.9 | 1.7 |
| HL 60° | 13.5 | 15 | 18 | 12 |
| Break index at 100° C. EB% | 800 | 780 | 490 | 630 |
| Tearability index at 100° C. TEB% | 510 | 500 | 230 | 80 |

It will be noted that the cohesion of compositions 1 and 2 according to the invention, which is evaluated by the elongation at break at 100° C. in the tearability test, is far greater than that of control compositions 3 and 4, which are not in accordance with the invention.

EXAMPLE 2

The object of this example is to compare compositions reinforced with silica as majority filler by varying the nature of the bonding and covering agents. In this example, the vulcanization system is adjusted so that the moduli of elongation at 100% are sufficiently close to draw reliable conclusions as to the effects of the parameters studied. The compositions according to the invention are set forth in Table 3. They comprise, in the case of tests 5, 6 and 7, compositions having silica as sole filler, in an amount of 30 phr with, respectively, a coupling agent X50S (test 5), a polyethylene glycol covering agent of a molecular weight of 4000 (test 6) and another polydimethylsiloxane covering agent (test 7). In the case of tests 8 to 12, the reinforcing filler is formed by a blend of silica and 5 phr of N330.

TABLE 3

| Composition | Test 5 | Test 6 | Test 7 | Test 8 | Test 9 | Test 10 | Test 11 | Test 12 |
| --- | --- | --- | --- | --- | --- | --- | --- | --- |
| Natural rubber | 100 | 100 | 100 | 100 | 100 | 100 | 100 | 100 |
| UVN3 | 30 | 30 | 30 | 25 | 30 | 35 | 30 | 35 |
| N330 | — | — | — | 5 | 5 | 5 | 5 | 5 |
| ZnO | 7 | 7 | 7 | 7 | 7 | 7 | 7 | 7 |
| Stearic acid | 1 | 1 | 1 | 1 | 1 | 1 | 1 | 1 |
| Antioxidant | 1.5 | 1.5 | 1.5 | 1.5 | 1.5 | 1.5 | 1.5 | 1.5 |
| X50S | 7 | — | — | — | — | — | — | — |
| PEG4000 | — | 4.3 | — | — | — | — | 4.3 | 5 |
| PDMS | — | — | 1.7 | 1.4 | 1.7 | 2.0 | — | — |
| Sulphur | 1.75 | 1.75 | 1.75 | 1.75 | 1.75 | 1.75 | 1.75 | 1.75 |
| Accelerators | 1.51 | 2.00 | 1.51 | 1.51 | 1.51 | 1.51 | 2.00 | 2.00 |

The compositions and vulcanizations of tests 5 to 12 are obtained under the same conditions as in Example 1.

The properties of these eight compositions are compared. The results are set forth in Table 4.

TABLE 4

| Composition | Test 5 | Test 6 | Test 7 | Test 8 | Test 9 | Test 10 | Test 11 | Test 12 |
|---|---|---|---|---|---|---|---|---|
| ME100 | 1.27 | 1.16 | 0.93 | 0.96 | 1.00 | 0.98 | 1.25 | 1.37 |
| HL 60° | 9.4 | 9.6 | 11.7 | 11.4 | 12.7 | 15.6 | 11.3 | 13 |
| EB (100° C.) | 733 | 770 | 855 | 813 | 856 | 867 | 762 | 736 |
| TEB (100° C.) | 590 | 371 | 793 | 538 | 726 | 685 | 277 | 307 |
| TBS (100°) | 84 | 38 | 60 | 51 | 67 | 62 | 38 | 38 |

For tests 5, 6 and 7, it will be noted that, with an amount of silica filler which is constant and in accordance with the invention, the coupling agent X50S surprisingly provides tearability results encompassed by those obtained with the covering agent PEG4000 and the covering agent PDMS.

For tests 8, 9 and 10, in the presence of the covering agent PDMS, with an amount of black of 5 phr and an amount of silica increasing from 25 to 35 phr, the best tearability results are obtained for the intermediate amount of silica of 30 phr.

By comparing the results of tests 7 and 9, on one hand, and 6 and 11, on the other hand, it will be noted that 5 phr of carbon black added to 30 phr of silica does not fundamentally change the tearability results in the presence of the covering agents PDMS or PEG4000.

Comparison of the results of tests 11 and 12 shows that passing from 30 to 35 phr of silica in the presence of 5 phr of carbon black slightly improves the results when the covering agent PEG 4000 is used, whereas the reverse effect is observed with the covering agent PDMS (tests 9 and 10).

EXAMPLE 3

The object of this example is to compare compositions reinforced with silica as sole or majority filler, where the elastomeric matrix is based on natural rubber, either pure or in a blend with another diene elastomer or based on synthetic polyisoprene having a large number of cis-1,4 bonds. These compositions are set forth in Table 5. They comprise, in the case of tests 13, 14 and 15, natural rubber filled with increasing amounts of filler. In the cases of tests 16 and 17, the natural rubber of test 15 is replaced by a blend of natural rubber with another minority diene elastomer or a cis-1,4 polybutadiene (cis-1,4 BR), obtained with a titanium-based catalyst, and a solution SBR of Mooney ML (1+4) of 54, of Tg −48° C., having a 1,2 bond content of 24% and a 16.5% styrene content. In the case of test 19, the natural rubber with 30 parts of silica filler of test 18 is replaced by a synthetic polyisoprene having a large number of cis-1,4 bonds. In the case of test 20, which is not in accordance with the invention, the blend of natural rubber and cis-1,4 BR of test 16 is filled with 30 parts of N330.

TABLE 5

| Composition | Test 13 | Test 14 | Test 15 | Test 16 | Test 17 | Test 18 | Test 19 | Test 20 Control |
|---|---|---|---|---|---|---|---|---|
| Natural rubber | 100 | 100 | 100 | 60 | 60 | 100 | — | 60 |
| Cis-polyisoprene | — | — | — | — | — | — | 100 | — |
| Solution SBR | — | — | — | — | 40 | — | — | — |
| cis-1,4 BR | — | — | — | 40 | — | — | — | 40 |
| UVN3 | 15 | 15 | 30 | 30 | 30 | 30 | 30 | — |
| N330 | — | 15 | 15 | 15 | 15 | — | — | 30 |
| Si116 | 2 | 2 | 4 | 4 | 4 | 4 | 4 | — |
| ZnO | 5 | 5 | 5 | 5 | 5 | 5 | 5 | 5 |
| Stearic acid | 1 | 1 | 1 | 1 | 1 | 1 | 1 | 1 |
| Antioxidant | 1.5 | 1.5 | 1.5 | 1.5 | 1.5 | 1.5 | 1.5 | 1.5 |
| Diphenylguanidine | 0.2 | 0.2 | 0.4 | 0.4 | 0.4 | 0.4 | 0.4 | — |
| Sulphur | 1.6 | 1.6 | 1.6 | 1.6 | 1.6 | 1.6 | 1.6 | 1.6 |
| Accelerators | 1.0 | 0.55 | 0.55 | 0.55 | 0.55 | 1.0 | 1.0 | 0.55 |

The compositions and vulcanization of tests 13 to 20 are obtained under the same conditions as in Example 1.

The properties of these eight compositions are compared. The results are set forth in Table 6.

TABLE 6

| Composition | Test 13 | Test 14 | Test 15 | Test 16 | Test 17 | Test 18 | Test 19 | Test 20 Control |
|---|---|---|---|---|---|---|---|---|
| Natural rubber | 100 | 100 | 100 | 60 | 60 | 100 | — | 60 |
| Polyisoprene | — | — | — | — | — | — | 100 | — |
| Solution SBR | — | — | — | — | 40 | — | — | — |
| Cis-1,4 BR | — | — | — | 40 | — | — | — | 40 |
| UVN3 | 15 | 15 | 30 | 30 | 30 | 30 | 30 | — |
| N330 | — | 15 | 15 | 15 | 15 | — | — | 30 |
| ME100 | 0.85 | 0.91 | 0.93 | 0.87 | 0.97 | 0.97 | 0.69 | 1.26 |
| HL | 5.4 | 11.0 | 16.5 | 24.4 | 25.2 | 8.2 | 11.5 | 12.8 |
| EB(100° C.) | 834 | 809 | 845 | 864 | 830 | 820 | 857 | 564 |
| TEB(100° C.) | 578 | 359 | 456 | 401 | 474 | 552 | 626 | 146 |
| TBS(100° C.) | 36 | 31 | 41 | 25 | 34 | 36 | 28 | 18 |

For the compositions according to the invention of tests 13 to 19, the characteristics of elongation at break in the tearability test at 100° C. are far higher than those obtained with the composition not in accordance with the invention containing 30 phr of carbon black. The natural rubber or a synthetic cis-1,4 polyisoprene or a blend of natural rubber as majority with another diene elastomer make it possible to obtain high cohesion with the silica filler or blends of silica and carbon black according to the invention.

In summary, the use of the compositions of the invention either with the carbon black filler used in an amount close to 25 phr or with a white filler of the silica and/or alumina type used alone or in a majority amount of about 35 phr independently of whether a coupling or covering agent is used, makes it possible to show that, compared with the known compositions based on carbon black used alone or as majority filler, the effects of mechanical stresses of the type of deformation imposed are less damaging and make it possible to increase the life of the tire, even more so since the compositions described are of low hysteresis, with the consequences of lower internal heating during travel and reduced thermal and/or thermo-oxidizing degradation of the carcass reinforcement.

Of course, the invention is not limited to the examples of embodiment described previously, from which other embodiments can be conceived of.

The invention claimed is:

1. A pneumatic tire comprising in its bottom zone comprising a bead, an elastomeric internal filler mix in the form of a profiled member which is located axially to the outside of the upturn of the carcass reinforcement, or a reinforcement profile for the beads of the tire which is located radially above the bead wire and adjacent to said bead wire, said elastomeric internal filler mix comprising a cohesive and low-hysteretic rubber composition comprising an elastomeric matrix and a reinforcing filler,
   (i) wherein the elastomeric matrix comprises more than 70 phr of natural rubber or synthetic polyisoprene having double bonds, the majority of which are cis-1,4 bonds,
   (ii) wherein the reinforcing filler is a blend of carbon black having a BET specific surface area of between 30 and 160 $m^2/g$ and of precipitated or pyrogenic silica having a specific surface area of between 30 and 260 $m^2/g$,
   (iii) wherein the amount of silica is greater than or equal to the amount of carbon black in phr minus 5 phr, and
   (iv) wherein said blend of carbon black and silica is in an amount between 15 phr and 45 phr, and wherein the amount of silica is from 15 phr to 35 phr and wherein the elastomeric matrix further comprises a coupling agent and/or a covering agent.

2. The tire of claim 1, wherein the carbon black has a BET specific surface area of between 90 and 150 $m^2/g$.

3. The tire of claim 1 or 2, wherein the composition further comprises an additional diene elastomer, wherein the majority of elastomer in the composition is the natural rubber or synthetic polyisoprene.

4. The tire of claim 3, wherein the additional diene elastomer is selected from the group consisting of a polybutadiene having double bonds, the majority of which are cis-1,4 bonds, a butadiene/styrene emulsion or solution copolymer having double bonds, the majority of which are trans-1,4 bonds, a butadiene/isoprene copolymer, and a styrene/butadiene/isoprene terpolymer.

5. The tire of claim 4, wherein the diene elastomer has active groups on the elastomer chain or at the end of the elastomer chain, said active groups being active with carbon black or with white fillers, or is starred by a carbonyl, silicon or tin halide.

6. The tire of claim 4, wherein the diene elastomer has been modified on the chain or at the end of the chain by a branching agent comprising divinylbenzene.

7. The tire of claim 1, wherein the blend of carbon black and silica is present in an amount between 20 and 45 phr.

8. The tire of claim 1, wherein said silica is present in an amount greater than 25 phr and less than or equal to 35 phr.

9. The tire of claim 1, wherein the elastomeric matrix comprises a covering agent selected from the group consisting of fatty alcohols, alkylalkoxy silanes, diphenylguanidines, polyethylene glycol and silicone oils.

10. The tire of claim 1, wherein the amount of said coupling agent and/or covering agent is in a weight ratio relative to the silica between 1/100 and 20/100.

11. The tire of claim 1, wherein the amount of said coupling agent and/or covering agent is in a weight ratio relative to the silica between 2/100 and 15/100.

12. The tire of claim 1, wherein said silica is present in an amount of between 30 and 35 phr.

13. The tire of claim 1, wherein said carbon black is present in an amount of 15 phr or less.

14. The tire of claim 1, wherein said carbon black is present in an amount of 5 phr or less.

* * * * *